United States Patent [19]

Burkett et al.

[11] 4,344,793

[45] Aug. 17, 1982

[54] MERCURY REMOVAL PROCESS AND APPARATUS

[75] Inventors: Ronald J. Burkett; Luther L. Dunn, both of Westfield, N.J.

[73] Assignee: Linden Chemicals & Plastics, Inc., Edison, N.J.

[21] Appl. No.: 156,217

[22] Filed: Jun. 3, 1980

[51] Int. Cl.³ ............................................. C22B 43/00
[52] U.S. Cl. ........................................ 75/81; 266/148; 266/149
[58] Field of Search ...................... 75/81; 266/148, 149

[56] References Cited

U.S. PATENT DOCUMENTS

| | | | |
|---|---|---|---|
| 3,596,893 | 8/1971 | Foliforov et al. | 266/148 |
| 3,802,869 | 4/1974 | Duane et al. | 75/81 |
| 3,814,685 | 6/1974 | Rachor | 75/81 |
| 4,087,276 | 5/1978 | Generini | 75/81 |
| 4,149,879 | 4/1979 | Loo | 75/81 |

OTHER PUBLICATIONS

Perry, R. A., *Chemical Engineering Progress*, vol. 70, No. 3, pp. 73-80, Mar. 1974.
*Chemical Abstracts* 84:138929a, May 17, 1976.

*Primary Examiner*—M. J. Andrews
*Attorney, Agent, or Firm*—Fitzpatrick, Cella, Harper & Scinto

[57] ABSTRACT

Disclosed herein is an apparatus and process for recovering mercury from a sludge which is discharged, for example, from a mercury-cell process for producing chlorine. In accordance with the invention the sludge is applied to a filter which washes away salt residue and provides an output constituting about 50% solid material. The filtrate is then applied to a dryer for further reduction of the water content, so that the output from the dryer constitutes about 95% solids. A muffle-type oven receives the output from the dryer and roasts the dried material while it is conveyed through the oven in a continuous process. The oven heats the dried sludge material to a temperature of about 1000° F. to vaporize the mercury, such vapor being carried away to a quench tower for further processing.

7 Claims, 3 Drawing Figures

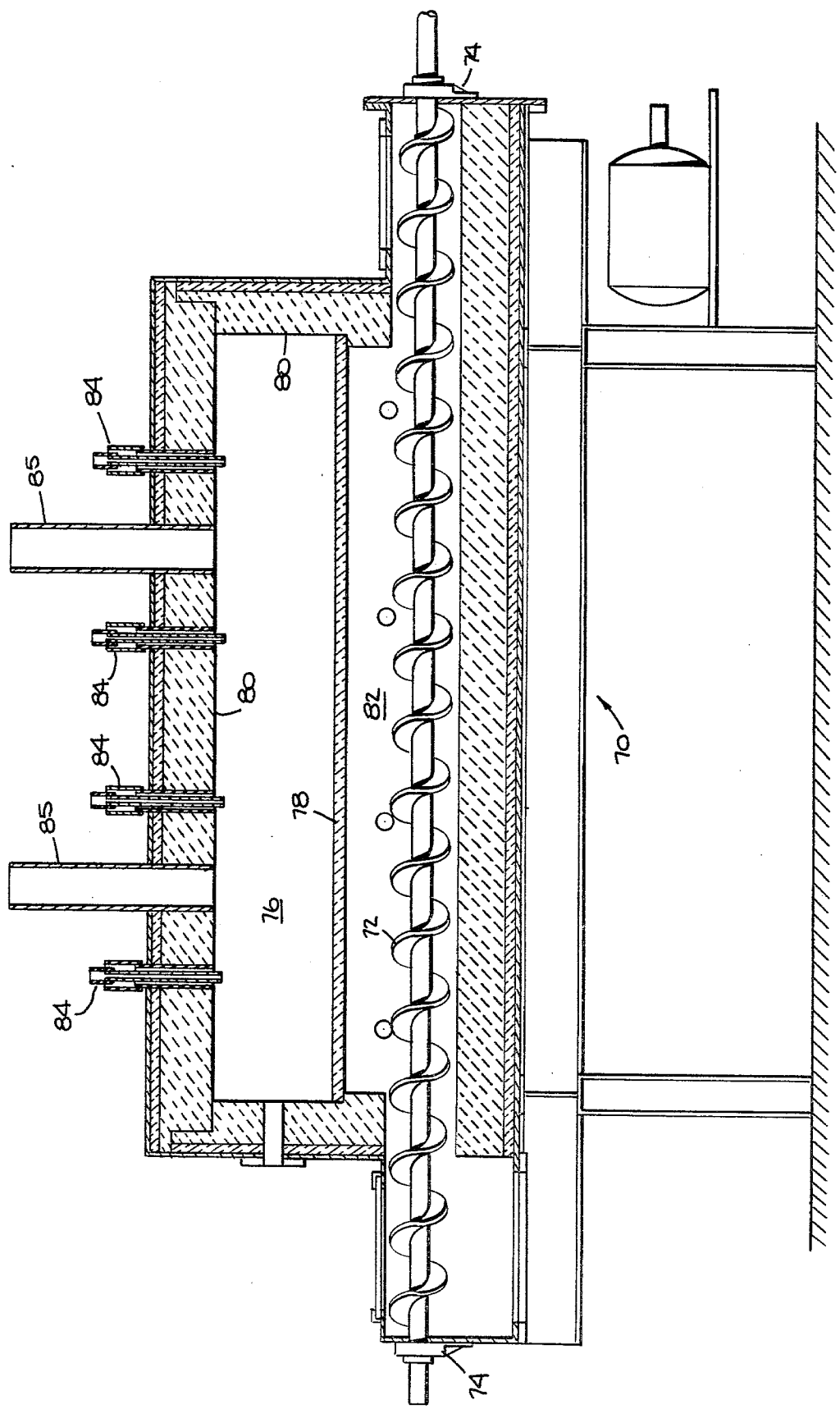

MERCURY REMOVAL PROCESS AND APPARATUS

TECHNICAL FIELD

This invention relates to an apparatus and process for recovering mercury from a waste sludge, such as the waste discharge from a mercury-cell chlorine production process.

In accordance with contemporary governmental regulations, mercury, above certain miniscule concentrations, is considered to be an environmental contaminant. Accordingly, specific proscriptions exist with respect to the discharge of chemical waste materials which include mercury. In this regard, waste discharges from the abovementioned chlorine producing process yield mercury concentrations which are considered to be toxic, and the present invention provides an apparatus and process for recovering the mercury from the discharged waste materials.

BACKGROUND ART

In the past it has been common to discharge waste materials from a mercury-cell chlorine process into a large settling pond or lagoon, where the solid materials are allowed to settle while the liquid is pumped out for reprocessing. According to present day environmental standards, however, such discharge techniques are highly undesirable. An expensive alternative is to dispose of the toxic waste material by loading it into containers, double-lined with PVC, and dumping the containers in a secured landfill provided with a leachate collection system. Also, reports indicate that attempts have been made, in conjunction with the spending of millions of dollars of federal research funds, to process such waste sludges on a batch basis in rotary hearth ovens, in an effort to reduce the mercury content to a tolerable level. However, it is understood that such attempts have been practical failures because of inadequate recovery of the mercury, followed by total failure of the apparatus due to corrosion and disintegration of various necessary elements thereof.

DISCLOSURE OF THE INVENTION

In accordance with the present invention there is provided an apparatus for receiving and purifying a supply of waste material from a mercury-cell chlorine production process. For example, in such a conventional process for producing chlorine, waste products are collected at several points, wherein the mercury concentrations at such points vary greatly. The wastes from all of such sources, when combined, may constitute a slurry having about 20% solids, wherein such solids may contain upwards of 500 ppm of mercury, as well as other contaminants. In the inventive apparatus, the slurry is received in a continuous stream for being purified in a single continuous process, rather than being discharged to a lagoon, to sealed containers, or to a batch processor.

Pursuant to the invention, the slurry is applied first to a filter for dissolving and washing away NaCl residue which results from the brine component of the waste materials. The sludge, when discharged from the filter, contains about 50% solid material which is then transferred, by means of a conveyor, to a dryer device utilizing indirect heat to reduce the moisture content of the sludge. The output from the dryer contains about 95% solid material, and is supplied to a roaster which comprises a muffle oven for vaporizing the mercury and for applying such vapor to a quench tower.

In the muffle oven the sludge is raised to a temperature in excess to 675° F. (the boiling point for mercury), and preferably to a temperature of 1000° F., whereby all of the mercury and mercury compounds in the sludge are vaporized in the oven. Furthermore, oxygen is supplied to the oven whereby a chemical reaction takes place therein so that the mercury sulfide (HgS) gases discharged from the sludge at 1000° F., react with the oxygen to produce $Hg + SO_2$. These latter products, when applied to the quench tower, are subjected to a stream of water including a small amount of caustic soda (NaOH), which is another product of the mercury-cell chlorine process. In this manner, the mercury vapors are condensed in the water and subsequently supplied to the brine source of the chlorine production apparatus, at which time the Hg is dissolved and then plated out in the primary cell of the process. On the other hand, the sulphur dioxide ($SO_2$) combines with the caustic soda to provide $Na_2SO_4 + H_2O$, wherein the sodium sulfate ($Na_2SO_4$) is dischargeable with no deleterious environmental effect.

BRIEF DESCRIPTION OF THE DRAWINGS

A preferred embodiment of the invention is illustrated in the accompanying drawings, wherein:

FIG. 3 is a schematic view of a muffle oven which may be utilized with the apparatus depicted in FIG. 2.

BEST MODE FOR CARRYING OUT THE INVENTION

Figure 1:
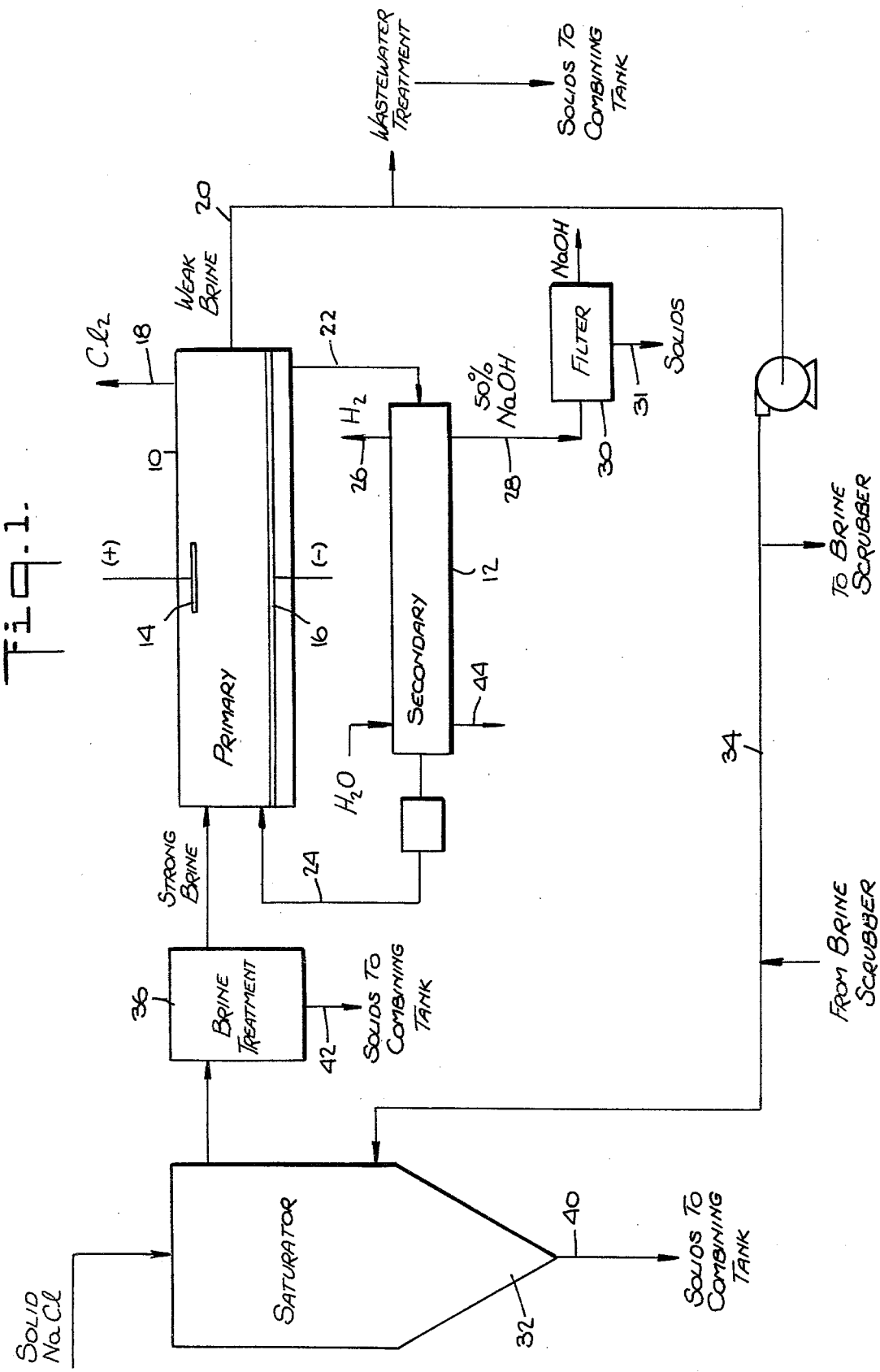
FIG. 1 is a schematic depiction of a mercury-cell chlorine production process.

Referring first to the schematic depiction of a mercury-cell chlorine process as shown in FIG. 1 of the drawings, there are provided primary and secondary process cells 10 and 12, respectively, used in a system as discussed for example in the text entitled: *Chlorine*, by J. S. Sconce, published by Reinhold Publishing Co., N.Y., N.Y., 1962. The primary mercury cell 10 includes positive and negative electrodes 14 and 16 between which a "strong" sodium chloride brine solution is passed, constituting, for example, 25% NaCl. An output 18 is provided for the removal of $Cl_2$ from the reaction which occurs in the primary cell, whereas a "weak" brine, 23% NaCl, is withdrawn at an output 20 connected from the primary cell. A third output 22 is connected from the primary to the secondary cell 12 wherein another reaction product of the primary cell, namely Hg(Na), is applied for further processing by the secondary cell. A second input is coupled to the secondary cell to supply water thereto, whereby a reaction occurs so that mercury is resupplied to the primary cell along a conduit 24 while the secondary cell provides two additional outputs, namely, $H_2$ at a second output 26, and a 50% NaOH (caustic soda) solution at an output 28. The output 28 is coupled to a filter 30 for removing solids from the caustic soda, wherein such solids are discharged from the filter at an output 31. The weak brine solution is applied to a saturator 32 along a conduit 34, together with a large quantity of solid sodium chloride to form the above-mentioned strong brine solution, which is then pumped to the primary cell through a known brine treatment device 36 disposed in a conduit 38, thereby providing a continuous process. A portion of the weak brine is purged and applied to a conventional wastewater treatment facility, and another portion is applied to a quench tower for the purpose described below.

The waste products from the chlorine producing process are collected from the various sources and combined in a slurry for processing. In this regard, sediment from the saturator, which carries mercury solids as well as mercury compounds, is discharged at an output 40, while the brine treatment device also has an output 42 for discharging mercury-contaminated solids, as does the secondary cell (at 44). Furthermore, disposable materials used in the process, such as gaskets, gloves and masks etc., are shredded and may be deposited directly into the dryer 65, and waste water, which is recovered from drains in the floor adjacent to the chlorine processing equipment, may be applied also to the recovery process of the invention.

Figure 2:
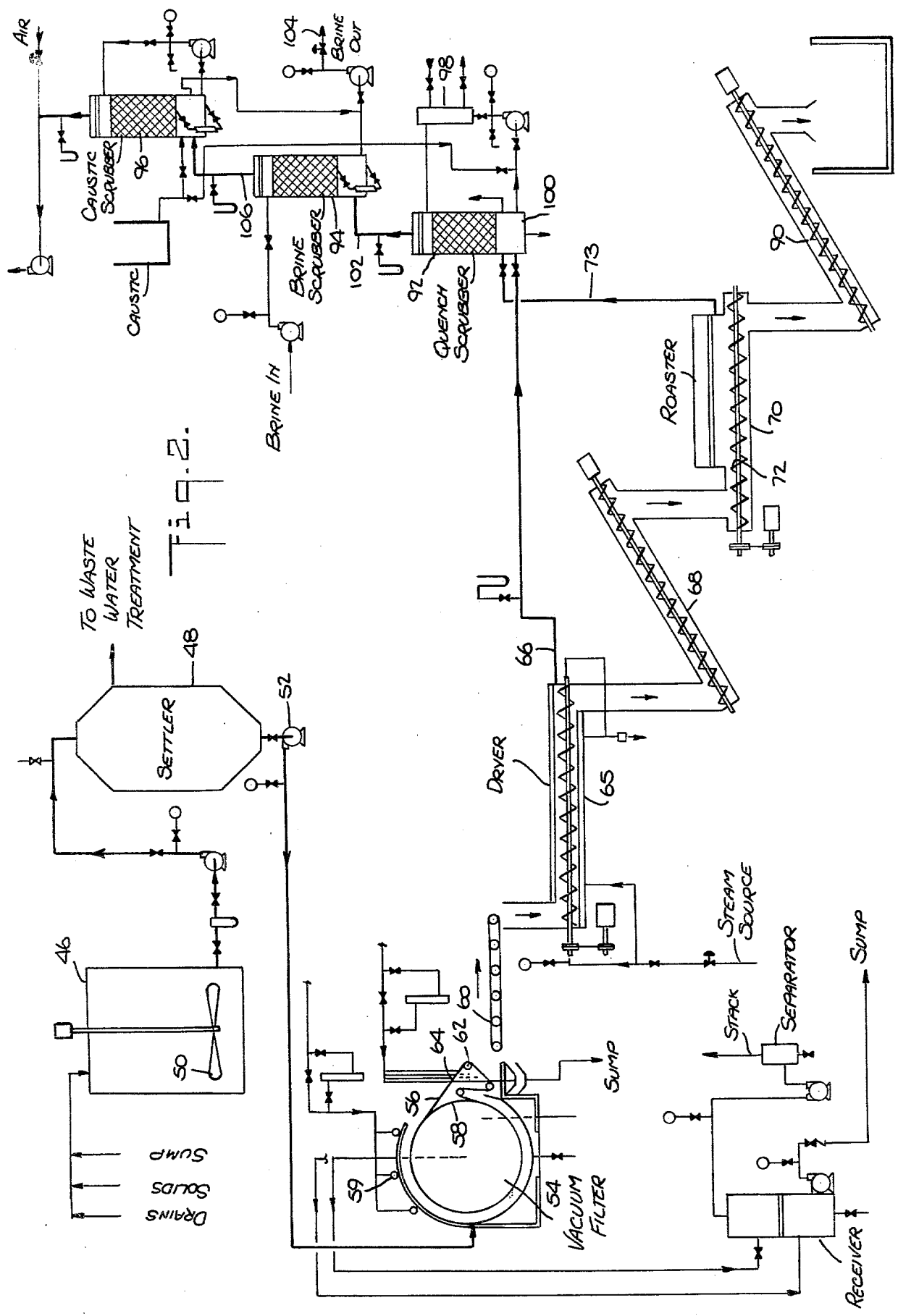
FIG. 2 is a schematic illustration of a mercury recovery apparatus and process in accordance with the present invention.

In accordance with the preferred configuration, the solids discharged from the saturator output 40, the brine treatment device output 42, the secondary cell output 44, the output from the wastewater treatment facility, and the output 31 from NaOH filter 30, are applied to a combining tank 46, as depicted, for example, in FIG. 2. In commercially operative processes sludge may be produced in quantities upwards of 10 tons/day, and a major portion of such sludge may constitute impurities in the NaCl supplied to the saturator 32.

As shown in FIG. 2, the combining tank also receives water from a sump which is connected to various process outlets throughout the system, and the floor drains in the vicinity of such equipment, as mentioned above, are also coupled to the combining tank. In this manner, it is believed that all necessary steps have been taken to collect mercury wastes for processing by the invention.

A settling tank 48 is provided to receive the contents of the combining tank, and an agitator 50 is disposed within the combining tank for the purpose of sufficiently mixing the contents thereof, so that all liquid and solid particles are eventually pumped to the settling tank. In this regard, the sediment material in the settling tank, constituting about 20% solids, is pumped therefrom by a sludge pump 52, while liquid is removed from the upper portion of the tank and applied to an independent and conventional wastewater treatment system. The sludge pump 52 transfers the 20% solid output from the settling tank to a vacuum filter 54, available for example from the Eimco Division of Envirotech Corp., and known as an Eimcobelt Filter, which may comprise a 6 foot long filter surface having a circumference of about 6 feet. The filter 54 performs two functions by washing the sludge mixture applied thereto, and by removing excess liquid. In this regard, by applying additional water to the sludge which is contaminated by undissolved salt and brine, additional quantities of salt are carried away with the water. In the operation of the vacuum filter 54 a filter belt 56 is drawn around a vacuum drum 58 disposed internally of the filter, so that the NaCl laden sludge applied to the filter is carried clockwise on the belt supported on the drum. Water is sprayed on the outer surface of the belt by spray heads 59 for removing the salt and brine which is then sucked through the belt material by the vacuum while the solid material is carried around the drum 58 and discharged down to a conveyor belt 60. That is, the solids of the filter cake formed on the belt 56 are broken as the belt travels over the sharp bend at the outermost roller 62, so that the filter cake, constituting about 50% solids, falls onto the conveyor 60. The filter belt is then continuously cleaned by wash water applied thereto as at 64, and the wash water and residue are collected for return to the combining tank along with the above-mentioned surface water. On the other hand, the liquid withdrawn by the vacuum drum is applied to the above-mentioned independent waste water treatment system. The filter 54 has an important function in accordance with the invention in that it removes NaCl from the sludge, thereby removing the source of corrosive substances which would otherwise attack various metallic and refractory materials utilized downstream in the inventive apparatus. That is, if not removed, the NaCl would combine with $H_2O$ at high temperature in subsequent process steps to produce hydrochloric acid (HCl) which attacks metal components, and sodium oxide (NaO) which attacks refractory materials. Another important function of the filter is to remove a substantial quantity of water from the sludge by means of the vacuum drum 58, so that subsequent water removal techniques, requiring large quantities of heat, may be operated more effectively, and so that there is less $H_2O$ to react deleteriously with any residual NaCl, as referred to above.

The conveyor 60 carries the filtered sludge to a jacketed dryer 65 wherein steam is applied at about 90 psig, in order to purge the sludge of additional quantities of water. The dryer may constitute, for example, a Holo-Flite Processer, available from the Western Precipitation Group, Joy Manufacturing Co. By such means the 50% liquid portion of the sludge is reduced to about 5% at the output of the jacketed dryer, and the vaporized liquid from the dryer is applied to a conventional vapor treatment apparatus along a conduit 66. The 95% solid sludge is then applied, for example by an inclined augur or screw conveyor 68, to the input of a sludge roaster 70. Shown schematically in FIG. 2, the sludge roaster has a pair of screw conveyors 72, disposed side-by-side, which may be operated in forward and reverse directions to adjust the residence time of the sludge within the roaster.

The residence time of the sludge in the muffle oven is not important other than to ensure that the sludge is maintained in the oven for a time sufficient to raise its temperature from about 250°–300° F. to a temperature of about 1000° F. This provides a satisfactory safety factor for causing the mercury in the sludge to be vaporized and discharged through a conduit 73, but such temperature is not so high as to cause liquefication of salt residues. As a result of such vaporization, the sludge, which may contain an intolerable amount of mercury, as for example, 500 ppm, may be detoxified to a level of less than 5 ppm of mercury and a leachate value of less than 200 ppb, which constitute acceptable discharge levels for all grades of landfill projects.

The details of the roaster are shown more clearly in FIG. 3 of the drawings wherein it will be noted that the screw conveyors are preferably mounted on water cooled bearings 74. In the preferred embodiment disclosed herein the roaster has an overall length of about 14 feet, whereas the combustion chamber 76 has a length of about 10 feet and a width of about 1 foot. The roaster oven is constructed so that a gas fired flame is applied to silicon carbide plates 78 constituting a muffle surface, wherein the combustion products do not contact the sludge. A refractory material 80 encloses the combustion chamber 76 as well as the sludge roasting chamber 82 and those two chambers are separated by the muffle plates 78. Such plates do not provide a seal between the combustion and vaporization chambers, however, and therefore excess oxygen from the combustion chamber passes through the plates and combines with the gases given off by the sludge within the roasting chamber. In this manner the gaseous mercury compound HgS reacts with the excess oxygen according to the equation

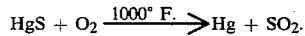

$$HgS + O_2 \xrightarrow{1000° F.} Hg + SO_2.$$

The quantity $SO_2$ is then reacted in the quench tower with NaOH, a by-product of the second stage of the chlorine producing process, according to the equation $SO_2 + NaOH \rightarrow Na_2SO_4 + H_2O$, wherein the quantity $Na_2SO_4$ does not constitute an environmental contaminant and may be readily discharged. In the depiction of the muffle oven, as shown in FIG. 3, the combustion fuel, e.g. propane, is applied to four burners 84 which heat the muffle plates 78, while the exhaust gases escape through the ports 85.

In the roaster shown in FIGS. 2 and 3 of the drawings the feeds for the four burners 84 may be coupled to three sources each, namely propane, combustion air, and hydrogen. As will be noted from the description of the mercury-cell apparatus shown in FIG. 1, hydrogen is a product of the process and may be used as fuel for the roaster 70. However, another fuel source (e.g. propane) is also necessary to provide for start-up heating, and to permit operation of the roaster when hydrogen is unavailable, as when the chlorine production process is not operating.

Returning to FIG. 2 of the drawing, the dual augurs 72 of the oven 70 are designed for operation at high temperature while being unsupported intermediate their end points, and the supporting bearings are water cooled in a conventional manner. As shown, the augurs advance the fully-processed sludge to the input of an inclined conveyor 90 for final discharge from the system. At such discharge, due to the vaporization of the mercury, the sludge contains only a slight amount thereof, on the order of 5 ppm, as mentioned hereinabove.

FIG. 2 also shows that the vapor outputs 66 and 73 of both the dryer and roaster are coupled to a quench tower for further processing, wherein the tower comprises a quench scrubber 92, a brine scrubber 94 and a caustic scrubber 96.

As will be appreciated from an understanding of the above-described apparatus, the indirect heating of the sludge in the roaster permits the products of combustion to be kept separate from the sludge, thus simplifying the purification requirements of the quenching apparatus by avoiding the application of an excessive heat load to the quencher. Additionally, the dual screw conveyor embodied in the roaster provides a very gentle agitation to the sludge while it is advanced through the roaster so that such sludge is sufficiently agitated to permit vaporization of the contaminants while the amount of dust which is generated is minimized. Accordingly, since the heat of the combustion gases, and the amount of dust generated by the advancing sludge are minimized with respect to the quench tower, such tower is capable of effectively and reliably processing the mercury vapors applied thereto. To further increase the efficiency of the apparatus and process, the dryer and roaster are maintained at a slight negative pressure, thus precluding the discharge of any mercury-laden dust or vapor therefrom, so that essentially all of the solid mercury originally carried by the sludge may be vaporized for processing by the quenching tower.

In the quench scrubber 92 the vapor products from the dryer 65 and roaster 70 are passed through a circulating stream of water which passes also through a heat exchanger 98 for maintaining the temperature of the quenching stream at a predetermined level by removing heat added thereto by the vapors. In this regard, a separate stream of cool water is coupled to the heat exchanger from a water tower and is returned to the water tower for cooling after it removes heat from the quenching stream. A small quantity of caustic is added to the closed system comprising the quenching stream for the purpose of reacting with $SO_2$ to provide $Na_2SO_4 + H_2O$ as discussed above. The metallic mercury is removed from the quench scrubber at an outlet 100, while all gases which are not condensed in the quench scrubber 92, as well as air, exit the scrubber through an outlet 102 which is coupled to the brine scrubber 94. The direct liquid quenching technique applied by the quench scrubber 92 prevents the condensation of and clogging up of the apparatus by mercury compounds, which might otherwise result if an indirect condensation was applied. The brine scrubber is supplied with a relatively small quantity of brine from the weak brine output 20 of the primary cell 10, whereas the output 104 of the brine scrubber is returned to the saturator 32. Accordingly, any trace of mercury which is pumped back to the mercury-cell process from the brine scrubber is eventually passed through the primary cell wherein the mercury is plated out by the electrodes 14 and 16.

All gases and air which exit the brine scrubber are applied to the caustic scrubber 96 along a conduit 106 which provides a final purification of the air before exhausting it to the atmosphere.

In summary, the process and apparatus described herein permit the effective removal of mercury from sludge, and it is believed that such successful results in a continuous process have never been obtained in accordance with prior art teachings.

We claim:

1. An apparatus for removing mercury and mercury compounds from a material in the form of a sludge or slurry, comprising a filter for removing liquid from the material; drying means, having an inlet for receiving the material from the filter, for further reducing the quantity of liquid in said material to a relative weight of about 5%; muffle oven means for roasting the dried material to raise its temperature to a level sufficient to vaporize the mercury; and a quench tower coupled to a vapor outlet of said muffle oven for receiving said vaporized mercury for recovery and reuse.

2. An apparatus as set forth in claim 1, wherein said filter means further comprises means for washing soluble solids from said material.

3. An apparatus as set forth in claim 1, wherein said muffle oven means raises the temperature of said material to a level on the order of 1,000° F.

4. A mercury recovery process for removing mercury and mercury compounds from a material in the form of a sludge or slurry, to thereby purify the sludge or slurry, comprising applying a process stream of said material to the sequential and separate steps of:

filtering liquid from said stream of material to provide a substance which is on the order of 50% solids;

drying said filtered material to reduce the liquid content thereof to a level on the order of about 5%;

applying said stream of dried material to a roaster, and roasting said dried material at a temperature sufficient to vaporize said mercury; and applying said vaporized mercury to a quench tower to condense and recover said mercury.

5. A mercury recovery process as set forth in claim 4, wherein said filtering is performed simultaneously with a washing step to remove soluble solids from said material.

6. A mercury recovery process as set forth in claim 4, wherein said roasting step is performed to raise the temperature of said material to a level on the order of 1000° F.

7. A mercury recovery process for removing mercury and mercury compounds from a process stream of material in the form of an NaCl-laden sludge or slurry, to thereby purify the sludge or slurry, comprising the sequential and separate steps of:

withdrawing said stream of material from a source thereof for continuous processing rinsing said material with water to dissolve said NaCl while filtering the material to remove liquid therefrom after said withdrawal;

applying the stream of filtered material to a drying apparatus and drying said filtered material to reduce the liquid content thereof to a level on the order of 5%;

applying the stream of dried material to a roaster, and roasting said dried material at a temperature sufficient to vaporize said mercury; and applying said vaporized mercury to a quench tower, and condensing and recovering said mercury, wherein all of said steps are performed separately and continuously on said stream of material.

* * * * *